UNITED STATES PATENT OFFICE.

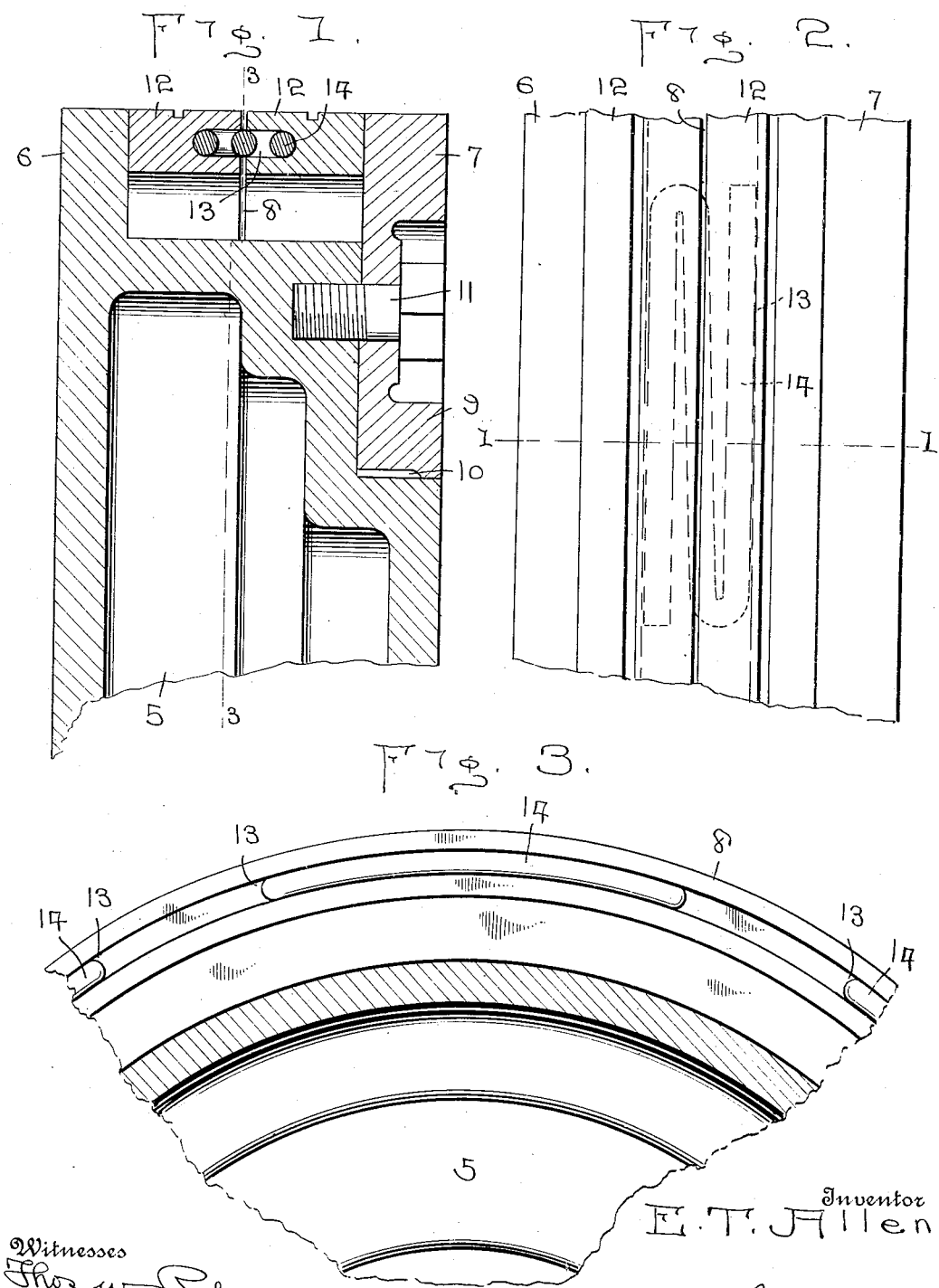

EDWARD THEODORE ALLEN, OF DETROIT, MICHIGAN.

PISTON.

1,045,930.  Specification of Letters Patent.  Patented Dec. 3, 1912.

Application filed May 21, 1912. Serial No. 698,766.

*To all whom it may concern:*

Be it known that I, EDWARD THEODORE ALLEN, a citizen of the Dominion of Canada, residing at Detroit, in the county of Wayne and State of Michigan, have invented certain new and useful Improvements in Pistons; and I do hereby declare the following to be a full, clear, and exact description of the invention, such as will enable others skilled in the art to which it appertains to make and use the same.

This invention relates to pistons, and it more particularly relates to piston rings and to a novel form of spring associated therewith.

An object of the invention is to provide piston rings in connection with a piston of ordinary construction, whereby steam, gas and the like is prevented from escaping past said rings.

A further object is to provide means associated with piston rings for preventing rattling and knocking of the same.

A still further object is to provide a novel device of the character described which may be applied to an ordinary piston and piston rings, without the necessity for the addition of complicated parts, and at a moderate expense.

A still further object is to provide means whereby the piston rings may be easily removed and replaced, without removing the piston from the engine cylinder.

Other objects and advantages may be recited hereinafter and in the claim.

In the drawings which form a part of this application, Figure 1 is a sectional view taken on a radial and axial plane through a fragment of the piston and piston rings and through the novel spring element embodying the essential feature of my invention. Fig. 2 is an elevation view of a fragment of a piston, my novel spring element being shown in broken lines, and Fig. 3 is a section view taken on the line 3—3 of Fig. 1.

Referring to these drawings, in which similar reference characters designate similar parts in the several views, the body of a piston is represented by the numeral 5. The piston 5 is provided with the usual flanges 6 and 7, between which is the usual peripheral channel or piston ring seat 8. The flange 6 is formed on a removable annular ring 9, seated in a cut-away portion 10 of the piston 5. The ring 9 is secured to the piston 5 by means of bolts, one of which is shown at 11. Piston rings 12 are seated, in the usual manner, in the channel 8. Each of the piston rings is provided with one or more arcuate or circular grooves 13, and seated in these grooves, is a series of substantially Z-shaped springs 14. The springs 14 are preferably formed of steel wire or rod, although, any proper material may be employed in their construction. The form of the spring member 14 may be described as, three integral elongated sections of metal having their centers on one common arc of a circle. The springs may also be described as a length of metal bent upon itself in two places so as to form two outer substantially parallel elements and an intermediate element standing at an angle to the outer elements. The grooves or spring seats 13 are preferably circular as shown, having the axis of the piston as their center, but I do not limit my invention to this exact formation.

In practice, two or more piston rings 12 are provided with opposing spring seats 13, and one of my improved piston ring springs is seated in each two opposing spring seats.

It is well known, that there must be a certain amount of "play" between piston rings and the groove in which they are seated, lest they should stick within said groove, thereby losing their utility. Now, as the piston rings become worn around their peripheries they move outward, by their own spring action, thereby leaving a considerable space between them and the bottom of the groove in which they are seated. It is also well known that certain portions of a cylinder, in which a piston works, wear away more rapidly than other portions, thereby causing an unevenness within said cylinder, which imparts a continual radial motion to the piston rings. It is quite obvious that this radial motion will gradually wear the piston rings away on their side surfaces and so, steam may pass between said side surfaces and under said piston rings, thereby affecting a counter pressure, or at least, not effecting the desired end.

When a set of piston rings are provided with my improved spring elements, said rings are held firmly seated against the flanges 6 and 7, at all times, and as said rings become worn on their side surfaces, the wear is then up by the pressure of the spring element. It is obviously impossible for the piston rings to become wedged or jammed within the seat 8, because of the resiliency of the spring element. When the piston rings become worn out, and it is desired to replace them with new ones, it is not essential to remove the piston from the engine cylinder, but it is only necessary to remove the bolts 11 and member 7—9, whereupon, the rings may be easily removed and replaced.

It is obvious that the device disclosed is capable of attaining the objects ascribed thereto in the foregoing, and in a thoroughly practicable and efficient manner.

I do not limit my invention to the exact details of construction, combination and arrangement of parts as recited and shown, but my invention may only be limited by a reasonable interpretation of the following claim.

I claim:

In an engine piston provided with a piston ring seat, a pair of piston rings provided with similar arcuate grooves, said piston rings being seated in the piston ring seat with said similar arcuate grooves opposite to each other, and a series of springs each comprising a length of wire bent upon itself so as to form three elongated segmental spring elements and being curved upon one common arc of a circle, said series of springs being seated within the opposite grooves in such relation as to extend an equal distance into each groove, said piston ring being held in spaced relation by said springs and being adapted for slight radial movement independently of each other.

In testimony whereof I have signed my name to this specification in the presence of two subscribing witnesses.

EDWARD THEODORE ALLEN.

Witnesses:
JAMES RIDDELL,
FRED. J. SMITH.